(12) United States Patent
Bernadat et al.

(10) Patent No.: US 8,156,740 B2
(45) Date of Patent: Apr. 17, 2012

(54) MASTER CYLINDER WITH REDUCED FREE TRAVEL

(75) Inventors: Olivier Bernadat, Le Perreux (FR);
 François Gaffe, Bondy (FR); Laurent Lhuillier, Le Blanc Mesnil (FR);
 Antony Auguste, Villier sur Marne (FR);
 Carole Charpentier, Montmorency (FR)

(73) Assignee: Robert Bosch GmbH, Stuttgart (DE)

( * ) Notice: Subject to any disclaimer, the term of this patent is extended or adjusted under 35 U.S.C. 154(b) by 543 days.

(21) Appl. No.: 12/427,382

(22) Filed: Apr. 21, 2009

(65) Prior Publication Data
US 2009/0288412 A1 Nov. 26, 2009

(30) Foreign Application Priority Data
May 21, 2008 (FR) ...................................... 08 02842

(51) Int. Cl.
 *F15B 7/08* (2006.01)
(52) U.S. Cl. .......................................................... 60/588
(58) Field of Classification Search .................... 60/585, 60/588
 See application file for complete search history.

(56) References Cited

U.S. PATENT DOCUMENTS

| 5,878,575 | A  | * | 3/1999 | Kreh et al. ...................... 60/588 |
| 6,272,858 | B1 |   | 8/2001 | Takano et al. |
| 7,055,322 | B2 | * | 6/2006 | Yasuda et al. ................... 60/588 |
| 7,997,075 | B2 | * | 8/2011 | Drott et al. ...................... 60/588 |
| 2011/0209472 | A1 | * | 9/2011 | Aoki et al. ....................... 60/585 |

FOREIGN PATENT DOCUMENTS

DE 102006022551 B3 10/2007

* cited by examiner

*Primary Examiner* — Michael Leslie
(74) *Attorney, Agent, or Firm* — Michael Best & Friedrich LLP

(57) ABSTRACT

The invention relates to a master cylinder (1) with reduced free travel (23). Current master cylinders have a free travel during the displacement of a piston (6) in a bore (5) of a master cylinder body (3). Such a free travel may be reduced with the aid of a frustoconical portion (24) in the piston, an orifice (14) for communication of hydraulic fluid being situated on said inclined wall, a gap (26) between the inclined wall and an inner wall (12) of the bore allowing a passage for hydraulic fluid capable of filling a pressure chamber (4). However, such inclined walls create a change in the slope of an outer wall (29) of the piston, this change being able to cause a separation of an inner lip (19) of a sealing cup (17). To prevent this separation, the invention provides that the inclined wall forms a convex rounded surface (32).

14 Claims, 2 Drawing Sheets

MASTER CYLINDER WITH REDUCED FREE TRAVEL

BACKGROUND AND SUMMARY OF THE INVENTION

The present invention relates to a master cylinder with reduced free travel. More particularly, the invention relates to a master cylinder piston and to a master cylinder comprising a piston according to the invention.

Current braking systems usually comprise a master cylinder. Such master cylinders comprise a master cylinder body. A pressure chamber is made in this master cylinder body. The pressure chamber forms a bore inside the body of the master cylinder. A piston is mounted slideably in the bore formed by the pressure chamber. The piston and the bore are of matching shape. Typically, the piston and the bore have a cylindrical shape. The piston then has a diameter that is smaller and close to the diameter of the bore.

The pressure chamber is supplied with brake liquid, or more usually with hydraulic fluid, by a hydraulic fluid reservoir. The pressure chamber is connected to the hydraulic fluid reservoir via a hydraulic fluid supply duct. The supply duct is made in the body of the master cylinder. An outlet of the supply duct is facing the piston. An orifice is made in the piston in order to allow the hydraulic fluid to travel from the supply duct into the pressure chamber.

A master cylinder supplies a hydraulic circuit with hydraulic fluid. For this, the pressure chamber comprises a hydraulic fluid outlet. Said outlet is made in a bottom of the pressure chamber. This outlet is directly connected to the hydraulic circuit. To supply the circuit with hydraulic fluid, the pressure in the pressure chamber must increase. The increase in pressure in the pressure chamber discharges the hydraulic fluid contained in said pressure chamber through supply outlets of the hydraulic circuit. The fluid expelled from the pressure chamber by the increase in pressure is injected into the hydraulic circuit.

During a braking action, the piston is displaced in the bore of the master cylinder body. This displacement reduces the size, and therefore the capacity for storing hydraulic fluid, of the pressure chamber. Moreover, this displacement closes the hydraulic fluid supply of the pressure chamber. Specifically, by displacing, the orifice made in the piston is facing an inner wall of the bore and the supply duct is facing an outer wall of the piston. However, to increase the pressure of the hydraulic fluid in the pressure chamber, the closure of the hydraulic fluid supply of the pressure chamber must be sealed.

In order to ensure the seal, and therefore the increase in pressure in the pressure chamber, a groove is made in the bore of the master cylinder body. This groove is situated such that, in the working position, that is to say during a displacement of the piston in the bore, the orifice made in the piston is situated either facing said groove or more distant from the supply duct than said groove.

A sealing cup is placed in the groove. This cup plays the role of a seal. The function of such a cup is to ensure the sealing of the closure of communication between the pressure chamber and the supply duct. For this, the cup is only partially housed in the groove. More particularly, a portion of the cup comes out of the groove in order to come into contact with the piston. This contact must ensure the seal between the supply duct and the orifice of the piston when the piston is in the working position. In the working position, the portion of the seal that comes out of the groove is situated either facing the orifice of the piston, so as to block said orifice, or in contact with an outer wall of the piston closer to the supply duct than said orifice of the piston. This positioning of the cup blocks the circulation of the hydraulic fluid between the orifice of the piston and the supply duct in a sealed manner.

The cup usually has the shape of a crown having a U shaped profile. The U shaped profile comprises a base and two lips. One lip, called the inner lip, is bonded against the outer wall of the piston. One lip, called the outer lip, is bonded against a bottom of the groove. The contact between the piston and the inner lip is sealed. The contact between the bottom of the groove and the outer lip is sealed.

When the piston slides, along an axis of displacement of the piston, until the inner lip is facing the orifice of the piston or the inner lip is closer to the supply duct than the orifice of the piston, the cup obstructs in a sealed manner the supply of fluid of the pressure chamber. This obstruction allows, if the piston continues to advance in the master cylinder, a rise in pressure in the pressure cylinder. The rise in pressure makes it possible to supply the hydraulic circuit with hydraulic fluid. This supply is produced by injecting the hydraulic fluid contained in the chamber into the hydraulic circuit. The supply of hydraulic fluid of a hydraulic braking circuit allows the braking action.

During a braking action, the orifice of the piston travels a certain distance, also called the free travel, before facing the inner lip or being more distant from the supply duct than the inner lip. The lack of communication between the supply duct and the pressure chamber is not sealed during the free travel. The absence of a seal during this free travel does not allow the pressure to rise in the pressure chamber. The absence of a rise in pressure in the pressure chamber does not allow braking. During the free travel, a user of a braking device presses on a brake pedal without there being any effective braking.

In order to limit or remove the free travel, it is possible to place the orifice as near as possible to the inner lip of the cup. The orifice is then not facing the supply duct. However, if the orifice of the piston is not facing the supply duct in the rest position, the flow rate of hydraulic fluid supplying the pressure chamber may be insufficient. Specifically, the liquid present in the pressure chamber and sent into the hydraulic circuit during a braking action is not replaced rapidly if the orifice of the piston is not facing the supply duct. It is possible to advance the orifice so that said orifice is only partially facing the supply duct. This partial facing position is such that it ensures a sufficient flow rate to fill the pressure chamber rapidly while reducing the free travel. However, such a partial facing position maintains a considerable free travel.

Master cylinder devices are known that make it possible to reduce the free travel and allow the braking action to be more responsive with respect to the user pressing on the pedal. Therefore, in U.S. Pat. No. 6,272,858, braking devices are known that comprise a piston having a frustoconical portion. The frustoconical portion then forms an inclined wall relative to an axis of displacement of the piston. The orifice of the piston is then situated on said inclined wall. The inclined wall is such that the external diameter of the piston, that is to say the diameter of the piston outside the frustoconical portion, is greater than or equal to the diameter of the piston at the frustoconical portion. There is then a gap between an inner wall of the bore and the piston at this frustoconical portion.

The orifice of the piston then no longer needs to be facing the supply duct. Specifically, the orifice of the piston being situated on the inclined wall, if the supply duct is even partially facing the frustoconical portion, the gap between an inner wall of the bore delimiting the supply duct and the inclined wall allows the passage of the hydraulic fluid. Depending on the inclination of the inclined wall relative to the axis of displacement of the piston and depending on the gap between the inclined wall and the inner wall of the bore delimiting the supply duct, a sufficient flow rate to effectively fill the pressure chamber may be supplied despite the orifice of the piston and the supply duct not facing one another.

However, such a frustoconical portion, although it makes it possible to greatly reduce the free travel, creates a junction zone forming a break in the diameter of the piston. This break may prevent a fully sealed contact between the inner lip and the piston. When the inner lip is pressed on the junction zone, a first portion of the inner lip is pressed on the inclined wall, but the rigidity of said inner lip prevents a second portion of the inner lip from being in contact with the external diameter of the piston. The inner lip is then only partially in contact with the piston. The partial contact of the inner lip with the piston creates a weakness of seal that can prevent the inner lip from correctly fulfilling its role as a seal. If the seal is no longer ensured, the pressure in the pressure chamber can no longer increase correctly. A lack of supply of the hydraulic circuit and therefore a failure of braking may take place.

Such a solution therefore does not make it possible to reduce the free travel considerably while maintaining a level of seal and of flow rate sufficient to ensure the correct operation of the master cylinder. This solution is therefore not acceptable as it is.

The device according to the invention proposes to reduce the free travel considerably while ensuring a perfect seal. For this, the device according to the invention proposes a master cylinder piston comprising an inclined wall. The inclined wall according to the invention forms a convex rounded surface. The orifice of the piston is situated wholly on said convex rounded surface. The presence of the inclined wall makes it possible to ensure a sufficient flow rate to fill the pressure chamber even though the orifice of the piston is not situated facing the supply duct. The inclined wall being rounded and convex, the inner lip remains, at every point of said inner lip facing the piston, in contact with the piston during a braking action. Such a contact ensures a seal capable of guaranteeing an effective rise in pressure in the pressure chamber. A separation of a portion of the lip is prevented by the convex curvature of the inclined wall.

The subject of the invention is therefore a brake master cylinder comprising, from a brake pedal to a bottom of the master cylinder, a master cylinder body, said master cylinder body comprising a chamber delimiting a bore of the body of the master cylinder, a piston sliding in the bore on an axis, a reservoir of hydraulic liquid supplying the chamber via an orifice in the piston and a supply duct in the master cylinder body, a sealing cup, the sealing cup being in contact via an inner lip with the periphery of the piston, and via an outer lip with the body of the master cylinder, said orifice being either facing said inner lip or more distant, depending on the position in displacement of the piston on an axis of displacement of said piston, from the supply duct than the inner lip during a braking action, the piston comprises a frustoconical portion, the frustoconical portion of the piston is formed by an inclined wall relative to an axis of displacement of the piston, characterized in that said inclined wall forms an incurved convex rounded surface from an external diameter of the piston to a diameter smaller than the external diameter of the piston, said rounded surface being such that an entrance of the orifice is wholly situated in the rounded surface.

A preferred embodiment of the invention provides that the rounded surface has a progressive curvature.

A preferred embodiment of the invention provides that, in the rest position, the orifice of the piston is at most partially facing the supply duct of the body of the master cylinder.

A preferred embodiment of the invention provides that the inclined wall is facing a portion of the master cylinder body, said portion forming a wall of the supply duct.

A preferred embodiment of the invention provides that a gap is present between the portion of the body of the master cylinder facing the inclined wall in the rest position.

A preferred embodiment of the invention provides that, in any working position, the inner lip is substantially parallel to the inclined wall.

A preferred embodiment of the invention provides that, when the master cylinder is at work, the inner lip is pressed over its whole surface against the inclined wall.

BRIEF DESCRIPTION OF THE DRAWINGS

The invention will be better understood on reading the following description and on examining the figures that accompany it. The latter are given only as an indication and are in no way limiting of the invention. The figures show.

DETAILED DESCRIPTION

Figure 1:
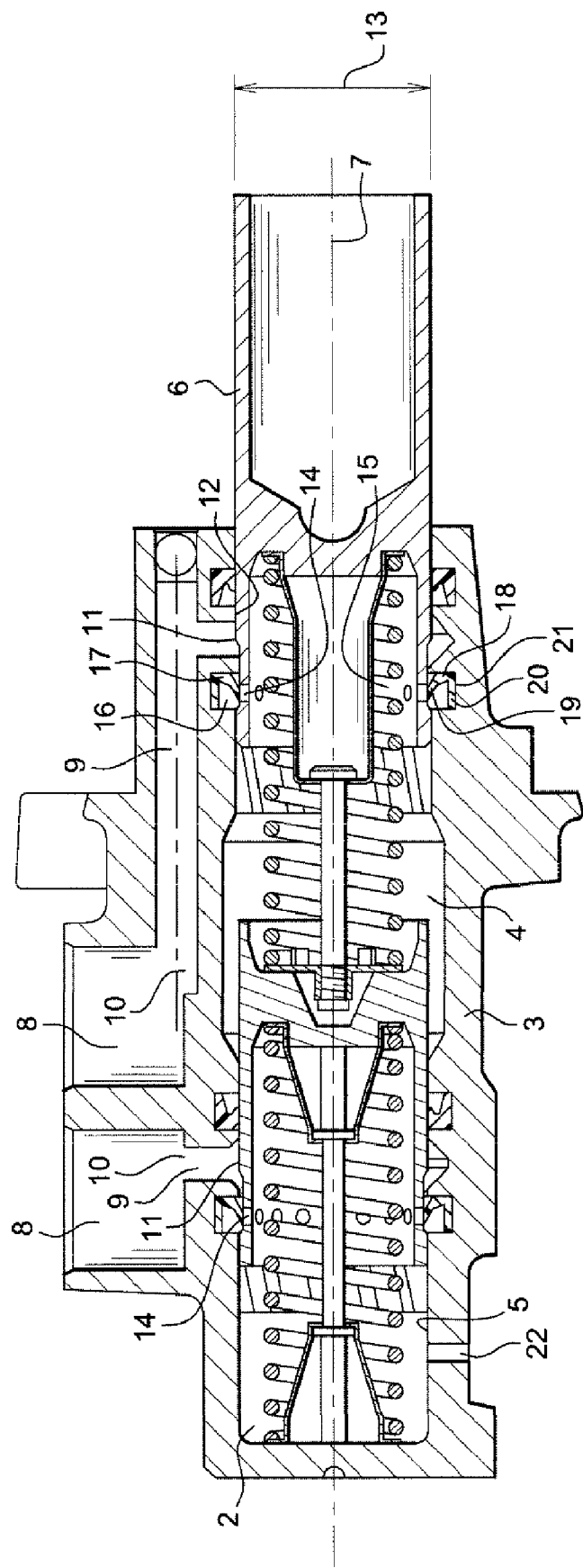
FIG. 1: a view in section of a conventional tandem master cylinder.

FIG. 1 represents a view in section of a conventional tandem master cylinder. It is evident that the invention may also apply in the case of a single master cylinder.

A master cylinder 1 of a braking device comprises, from a brake pedal to a bottom 2 of the master cylinder 1, a master cylinder body 3. The master cylinder body 3 comprises an internal volume in which a pressure chamber 4 is situated. The pressure chamber 4 forms a bore 5 forming the internal volume. A piston 6 is situated in the bore 5. Such a piston 6 is mounted slideably in the bore 5. The piston 6 slides on an axis 7 of displacement.

A reservoir 8 of hydraulic fluid communicates with the pressure chamber 4. This communication is via a supply duct 9. Such a supply duct 9 has a duct entrance 10 situated in the reservoir 8. The supply duct 9 comprises a duct outlet 11 situated on an inner wall 12 of the bore 5. The piston 6 is situated in the bore facing the duct outlet 11. The gap between the inner wall 12 and the bore 5 and an external diameter 13 of the piston 6 is such that it does not allow a sufficient flow rate to fill the pressure chamber 4 correctly. An orifice 14 is present in the piston 6. Such an orifice 14 allows the circulation of the hydraulic fluid from the duct outlet 11 to the pressure chamber via an inner portion 15 of the piston 6.

A groove 16 is made in the bore 5. The groove 16 is situated facing the piston 6. A sealing cup 17 is partially housed in the groove. The sealing cup 17 has a U shaped profile in section. Typically, the cup 17 comprises a base 18, an inner lip 19 and an outer lip 20. The base 18 of the cup 17 represents the bottom of the U shaped profile. The lips 19 and 20 of the cup 17 represent the branches of the U shaped profile. The inner lip 19 is in contact with the piston 6. The contact between the piston 6 and the inner lip 19 is sealed. The outer lip 20 is in contact with a bottom 21 of the groove 16. The contact between the outer lip 20 and the bottom 21 of the groove 16 is sealed.

During a braking action, the piston 6 is displaced in the bore 5. Such a displacement takes place along the axis of displacement 7. During this displacement, the orifice 14 is displaced in the bore 5. The displacement of the orifice 14 in the groove 5 closes the communication between the supply duct 9 and said orifice 14. Specifically, the supply duct 9 and the orifice 14 no longer facing one another following the displacement of the piston 6, the hydraulic fluid cannot circulate with a sufficient flow rate between the external diameter 13 of the piston 6 and the inner wall 12 of the bore 5. However, this closure of the communication is not sealed. The seal of the closure of the communication between the orifice 14 and the supply duct 9 is obtained only when the cup 17 is either facing said orifice 14 or when the cup 17 is closer to the supply duct 9 than the orifice 14 in sealed contact with the piston 6, typically when the cup 17 is situated between the orifice 14 and the supply duct 9. If communication between the orifice 14 and the supply duct 9 is cut off in a sealed manner, the advance of the piston 6 in the bore 5 raises the pressure in the pressure chamber 4. This pressure rise in the pressure chamber 4 discharges the hydraulic fluid through a supply outlet 22 of a hydraulic circuit. Said supply outlet 22 of a hydraulic circuit is situated in the bottom 2 of the master cylinder.

The displacement of the piston 6 from its rest position, that is to say with no braking action, to a working position, that is to say its position during braking, making it possible to raise the pressure in the pressure chamber 4 is called a free travel 23. Typically, the free travel 23 corresponds to the travel of the piston 6 from its rest position to the position for which communication between the supply duct 9 and the orifice 14 is cut off in a sealed manner.

Figure 2:
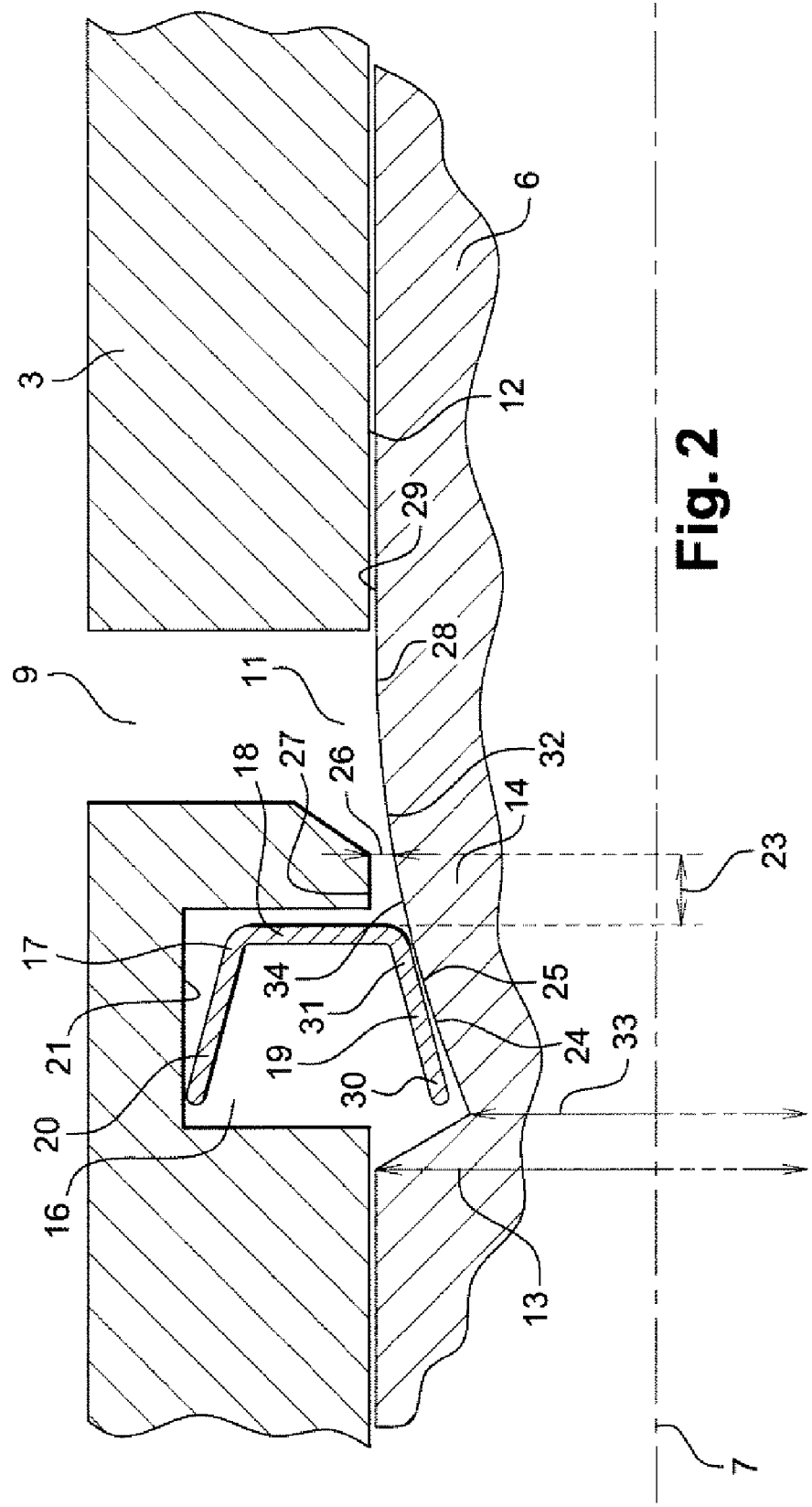
FIG. 2: a view in partial section of a master cylinder according to the invention.

FIG. 2 represents a view in partial section of a master cylinder according to the invention.

In order to reduce this free travel, a device provides that the piston 6 comprises a frustoconical portion 24. The frustoconical portion 24 of the piston 6 is formed by an inclined wall 25 relative to the axis 7 of displacement of the piston 6. The orifice 14 is wholly situated on this inclined wall 25. The inclined wall 25 is at least partially facing the supply duct 9. This partial facing position ensures a gap 26 between the inclined wall 25 and a wall 27 of the bore forming the supply duct 9. The gap 26 ensures a passage for the hydraulic fluid that is sufficient to fill the pressure chamber 4 and to do so even if the orifice 14 is not at all or slightly facing the supply duct 9.

Such an inclined wall 25 makes it possible to place the orifice 14 closer to the cup 17 while maintaining a sufficient supply of the pressure chamber 4. The orifice 14 being closer to the cup 17, the distance to be travelled for the piston 6 to close communication between the supply duct 9 and the orifice 14 in a sealed manner with the aid of the cup 17 is reduced.

However, such an inclined wall may create a break in the travel of the cup 17 on the piston. Typically, a junction 28 between the inclined wall 25 and an outer wall 29 of the piston 6 is such that the cup 17 is only partially in contact with the piston 6. The outer wall 29 of the piston 6 is formed by the wall of the piston 6 facing the body of the master cylinder 3 on the periphery of the diameter 13 of the piston 6. Typically, the inclined wall 25 is such that any point of said inclined wall 25 is closer to the axis 7 of displacement than any point of the outer wall 29 of the piston 6.

When the inner lip 19 is pressed on the junction 28, a first portion 30 of the inner lip 19 is pressed on the inclined wall 25, a second portion 31 of the inner lip 19 is facing the outer wall 29 of the piston 6. Contact between the inner lip 19 and the piston is then only partial, the rigidity of the inner lip 19 being able to prevent a total contact because of the change in angle created by the junction 28. This partial contact does not make it possible to ensure a perfect seal. Similarly, if the second portion 31 of the inner lip 19 is in contact with the outer wall 29 of the piston 6, a separation of the first portion 30 of the inner lip 19 may take place. Such a separation prevents the sealed contact between the first portion 30 of the inner lip 19 and the inclined wall 25. The inner lip 19 is in only partial contact with the piston 6. This partial contact does not make it possible to ensure the perfect seal of the contact between the inner lip 19 and the piston 6.

To ensure a contact between the inner lip 19 and the piston that is perfectly sealed despite the presence of the inclined wall 25, the device according to the invention provides that said inclined wall 25 forms a convex rounded surface 32. The convex rounded surface 32 is then incurved from an external diameter 13 of the piston 6, said external diameter 13 forming the outer wall 29 of the piston 6, to a diameter 33 of the inclined wall 25. The diameter 33 of the rounded surface 32 is less than the external diameter 13 of the piston 6 at every point of the rounded surface 32. The rounded surface 32 is such that an entrance 34 of the orifice 14 is wholly situated in said rounded surface 32. The convex curvature of the rounded surface 32 ensures a total and hence perfectly sealed contact between the cup 17 and the piston 6. The convex curvature of the rounded surface 32 prevents the creation of a change of angle of inclination in the junction zone 28. The absence of a change of angle at the junction 28 prevents a separation of the inner lip 19 when said inner lip is in contact with the junction zone 28. The cup 17 then closely hugs the rounded surface 32.

In a preferred embodiment of the invention, the curvature of the rounded surface 32 may be progressive. This progressive curvature reduces to the maximum the change of angle of the junction 28. The inner lip 19 remains in perfectly sealed contact with the piston 6.

In a preferred embodiment of the invention, in the rest position, the orifice 14 of the piston 6 is at most partially facing the supply duct 9. The offset, on an axis perpendicular to the axis 7 of displacement of the piston 6, between the supply duct 9 and the orifice 14 makes it possible to place the orifice 14 closer to the cup 17 in the rest position. This positioning of the orifice 14 close to the cup 17 reduces the free travel 23. The flow rate of hydraulic fluid making it possible to fill the pressure chamber 4 is ensured by the gap 26 between the rounded surface 32 and the wall 27 of the bore 5. Typically, the inclined wall, on an axis perpendicular to the axis 7 of displacement of the piston 6 is facing the inner wall 27 of the bore 5 delimiting a wall of the supply duct 9. The inclined rounded surface therefore interacts with the cup 17 so that, in any working position, that is to say when the piston 6 is displaced in the bore 5, the inner lip is substantially parallel to the inclined wall 25. Similarly, when the master cylinder is at work, the inner lip is pressed over the whole of its surface facing the inclined wall against said inclined wall.

Therefore, according to the invention, when the master cylinder 1 is at work, the inner lip 19 is pressed over the whole of its surface against the inclined wall 25. For this, the inclined wall 25 achieves the external diameter 13 of the piston 6 without a change in the slope.

What is claimed is:

1. Brake master cylinder comprising, from a brake pedal to a bottom (2) of the master cylinder,
   a master cylinder body (3), said master cylinder body comprising a chamber (4) situated in a bore (5) of the body of the master cylinder,
   a piston (6) sliding in the bore on an axis (7) of displacement of the piston,
   a reservoir (8) of hydraulic liquid supplying the chamber via an orifice (14) in the piston and a supply duct (9) in the master cylinder body,
   a sealing cup (17), the sealing cup being in contact via an inner lip (19) with the periphery of the piston, and via an outer lip (20) with the body of the master cylinder, said orifice being either facing said inner lip or more distant, depending on the position in displacement of the piston on an axis of displacement of said piston, from the supply duct than the inner lip during a braking action, the piston comprises a frustoconical portion (24), the frustoconical portion of the piston is formed by an inclined wall (25) relative to an axis of displacement of the piston, characterized in that said inclined wall forms an incurved convex rounded surface (32) from an external diameter of the piston to a diameter (33) smaller than the external diameter of the piston, said rounded surface being such that an entrance (34) of the orifice is wholly situated in the rounded surface.

2. Master cylinder according to claim 1, characterized in that the rounded surface has a progressive curvature.

3. Master cylinder according to claim 1, characterized in that, in the rest position, the orifice of the piston is at most partially facing the supply duct of the body of the master cylinder.

4. Master cylinder according to claim 1, characterized in that the inclined wall is facing a portion (27) of the master cylinder body, said portion forming a wall of the supply duct.

5. Master cylinder according to claim 4, characterized in that a gap (26) is present between the portion of the body of the master cylinder facing the inclined wall in the rest position.

6. Master cylinder according to claim 1, characterized in that in any working position, the inner lip is substantially parallel to the inclined wall.

7. Master cylinder according to claim 1, characterized in that, when the master cylinder is at work, the inner lip is pressed over its whole surface facing the inclined wall against said inclined wall.

8. Master cylinder according to claim 1, characterized in that the inclined wall reaches the outer diameter of the piston without a change in slope.

9. Master cylinder according to claim 2, characterized in that, in the rest position, the orifice of the piston is at most partially facing the supply duct of the body of the master cylinder.

10. Master cylinder according to claim 9, characterized in that the inclined wall is facing a portion (27) of the master cylinder body, said portion forming a wall of the supply duct.

11. Master cylinder according to claim 10, characterized in that a gap (26) is present between the portion of the body of the master cylinder facing the inclined wall in the rest position.

12. Master cylinder according to claim 11, characterized in that in any working position, the inner lip is substantially parallel to the inclined wall.

13. Master cylinder according to claim 12, characterized in that, when the master cylinder is at work, the inner lip is pressed over its whole surface facing the inclined wall against said inclined wall.

14. Master cylinder according to claim 13, characterized in that the inclined wall reaches the outer diameter of the piston without a change in slope.

\* \* \* \* \*